(12) United States Patent  (10) Patent No.: US 6,694,711 B1
Cullen  (45) Date of Patent: Feb. 24, 2004

(54) DENSITY CONTROL AND ANCHORING MEANS FOR AN AGRICULTURAL BAGGING MACHINE

(75) Inventor: Steven R. Cullen, Astoria, OR (US)

(73) Assignee: SRC Innovations, LLC, Astoria, OR (US)

( * ) Notice: Subject to any disclaimer, the term of this patent is extended or adjusted under 35 U.S.C. 154(b) by 0 days.

(21) Appl. No.: 10/241,788

(22) Filed: Sep. 10, 2002

(51) Int. Cl.[7] .............................. B65B 1/24; B65B 25/04
(52) U.S. Cl. .............................. 53/527; 53/567; 53/576; 100/100; 141/73
(58) Field of Search .......................... 53/567, 576, 527; 141/73, 313; 100/100, 144

(56) References Cited

U.S. PATENT DOCUMENTS

| 3,687,061 A | 8/1972 | Eggenmuller |
| 4,046,068 A | 9/1977 | Eggenmuller et al. |
| 4,337,805 A | 7/1982 | Johnson et al. |
| 4,621,666 A | 11/1986 | Ryan |
| 5,297,377 A | 3/1994 | Cullen |
| 5,421,142 A | 6/1995 | Cullen |
| 5,425,220 A | 6/1995 | Cullen |
| 5,463,849 A | 11/1995 | Cullen |
| 5,464,049 A | 11/1995 | Cullen |
| 5,517,806 A | 5/1996 | Cullen |
| 5,671,594 A | 9/1997 | Cullen |
| 5,775,069 A | 7/1998 | Cullen |
| 5,857,313 A | 1/1999 | Cullen |
| 5,899,247 A | 5/1999 | Cullen |
| 6,430,897 B1 * | 8/2002 | Cameron et al. ............. 53/576 |

* cited by examiner

*Primary Examiner*—John Sipos
(74) *Attorney, Agent, or Firm*—Thomte, Maszour & Niebergall; Dennis L. Thomte

(57) ABSTRACT

An density control/anchor cable is provided on an agricultural bagging machine for engagement with the material being bagged as the material is forced past the density control/anchor cable into the bag being filled with agricultural material. The forward ends of the U-shaped density control/anchor cable are attached to first and second trolleys which are movably mounted on an I-beam positioned within the tunnel of the machine. The trolleys may be moved towards one another in tandem and away from one another in tandem from a position remote therefrom. One end of the density control/anchor cable may be selectively released from the second trolley from a position remote therefrom, thereby releasing the anchor effect of the U-shaped cable. The movement of the trolleys with respect to one another permits the precise density control of the material being packed.

20 Claims, 9 Drawing Sheets

DENSITY CONTROL AND ANCHORING MEANS FOR AN AGRICULTURAL BAGGING MACHINE

BACKGROUND OF THE INVENTION

1. Field of the Invention

This invention relates to a density control and anchoring means for an agricultural bagging machine and more particularly to both an improved density control means and anchoring means for an agricultural bagging machine for achieving the optimum internal density of bagged materials.

2. Description of the Related Art

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. As silage is loaded into the bag, the bagging machine moves away from the filled end of the bag in a controlled fashion so as to achieve both uniform and maximum compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on the bagging machine with a brake associated therewith for braking or resisting the rotation of the drum with a selected brake force. A cable is wrapped around the drum and is connected to the backstop.

Although the cable drum and backstop structure of the '805 patent and other similar machines do function generally satisfactorily, the cables, which are positioned on opposite sides of the bag, can create openings or holes in the bag which will adversely affect the fermentation process within the bag. A further disadvantage of the cable drum and backstop structure of the devices such as shown in the '805 patent is that the cables must be rewound after the filling of an individual bag. A further disadvantage of the cable drum and backstop structure of the machine such as disclosed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely affect the bagging operation. It is also believed that the brake means alone on the bagging machine such as those disclosed in the '666 patent do not achieve the desired compaction of the silage material within the bag.

In an effort to overcome the problems of the prior art, applicant patented several inventions relating to different means for controlling the density of the bagged materials and anchoring the machine to the bagged materials. See, for example, U.S. Pat. Nos. 5,671,594; 5,297,377; 5,425,220; 5,857,313; 5,463,849; 5,464,049; 5,775,069; and 5,517,806, all of which utilize one or more U-shaped cables which function both as a density control means for the material being bagged and as a means of anchoring the machine to the bagged material, thereby resisting machine movement without the use of cables and back-stops or braking devices.

Under the prior state of the art, the density control cable is attached to the frame of the bagging machine with the "fixed end" of the cable secured to the frame with a shackle U-bolt and the other end of the cable being connected to a hook or pin, equipped with a piston-like releasing device, which is also attached to the machine frame. From these two points of attachment, the cable is routed around a pivot wheel and through horizontal slots. Each pivot wheel is connected by cables and pulleys to a hydraulic cylinder which horizontally moves them in tandem either closer or farther apart. In this manner, the operator is able to adjust the width of the loop in the cable to match the type of material being packed. By varying the width of the cable loop, and thereby changing the shape of the loop in the cable, the density of the packed materials is either increased or decreased.

One of the problems of the prior art devices is that when the bagging operation has been completed, it is difficult to release one end of the cable so that the cable may be pulled from the bagged material. Although the density control and anchoring means disclosed in applicant's earlier patents are believed to represent a significant advance in the bagging art, it is believed that the instant invention represents a significant advance in the art.

SUMMARY OF THE INVENTION

A bagging machine for bagging material into a bag having a closed end and an open mouth with the machine including a movable frame having rearward and forward ends. A tunnel or enclosure is mounted on the frame and has an intake end for receiving the material to be bagged and an output end adapted to receive the open mouth of the bag. A hopper means is provided on the frame for receiving the material to be bagged. A rotor means is provided on the frame for forcing the material to be bagged through the tunnel and into the bag. A transversely extending I-beam is mounted on the frame within the tunnel which has first and second trolleys movably mounted thereon. The first and second ends of a U-shaped cable are secured to the first and second trolleys, respectively. The first and second trolleys are operatively connected to a chain which, when moved in one direction, causes the trolleys to be moved in tandem away from one another and which, when moved in a second direction, causes the trolleys to be moved in tandem towards one another. The releasing mechanism on the second trolley for the second end of the cable is operated from a position outwardly of the tunnel. The releasing mechanism, positioned on the outside of the machine, may be remotely activated, e.g., from the operator's area, by either hydraulic, electrical or other means. Instead of just a U-shaped cable, first and second cables or chains, looped or separately independent, may be secured to the first and second trolleys, respectively, with those cables, or chain or other density control and anchoring devices having an anchor affixed thereto.

It is therefore a principal object of the invention is to provide an improved density control means and an anchoring means for an agricultural bagging machine.

Yet another object of the invention is to provide a density control means and anchoring means for an agricultural bagging machine which may be operated from a position outwardly and remotely of the tunnel of the machine.

Still another object of the invention is to provide a machine of the type described including an I-beam positioned within the tunnel of the machine with first and second trolleys being movable in tandem on the I-beam towards one another and away from one another with the first and second trolleys having the ends of a U-shaped density control/anchor cable secured thereto.

Still another object of the invention is to provide a device of the type described wherein one end of a U-shaped density control/anchor cable is fixed to a first trolley and wherein the second end of the U-shaped density control/anchor cable is selectively releasably secured to the second trolley.

Still another object of the invention is to provide a device of the type described wherein the release means on the second trolley may be controlled from a position outwardly of the tunnel.

Still another object of the invention is to provide an improved density control means and anchoring means for an agricultural bagging machine including a pair of trolleys movably mounted on an I-beam with the trolleys being precisely movable in tandem towards one another and away from one another and with the trolleys having the ends of a U-shaped density/anchor cable secured thereto.

These and other objects of the invention will be apparent to those skilled in the art.

DESCRIPTION OF THE PREFERRED EMBODIMENT

Figure 1:
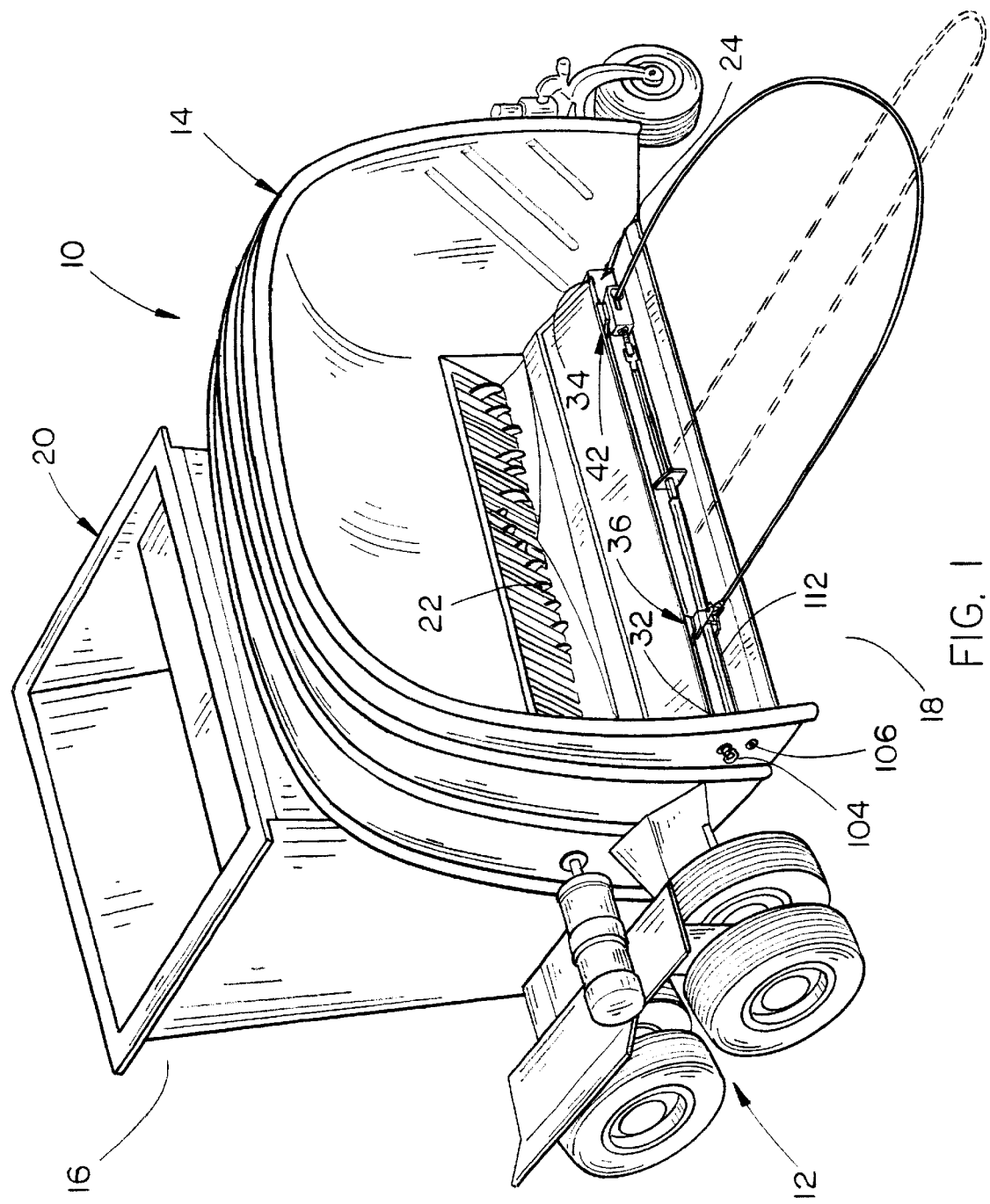
FIG. 1 is a rear perspective view of an agricultural bagging machine having the density control means of this invention mounted thereon.

The numeral 10 refers generally to an agricultural bagging machine such as described in my U.S. Pat. Nos. 5,671,594; 5,297,377; 5,425,220; 5,857,313; 5,463,849; 5,464,049; 5,775,069; and 5,517,806, all of which utilize one or more U-shaped cables which function as a density control means and anchoring means for the material being bagged. Machine 10 includes a wheeled frame 12 having a tunnel 14 or enclosure mounted thereon upon which is normally positioned the open mouth of a conventional agricultural bag. Although the preferred embodiment includes a wheeled frame, a non-wheeled frame could also be employed. For purposes of conciseness, the power means for driving the various components of the machine will not be disclosed since the same does not form a part of the invention. The power means could be an engine mounted on the machine or a PTO shaft connected to a tractor PTO.

For purposes of description, the bagging machine will be described as including a forward end 16 and a rearward end 18. Bagging machine 10 includes a hopper means 20 at the forward end thereof which is adapted to receive the material to be bagged from a truck, wagon, etc. The material to be bagged is supplied to the upper end of the hopper 20 by any convenient means such as by a feed table, conveyor, etc. In some cases, the feed table could replace the hopper. A horizontally disposed rotatable rotor 22 of conventional design is located at the lower end of the hopper means 20 for forcing the material to be bagged into the tunnel 14 and into the bag in conventional fashion. Although a rotor 22 is disclosed, other types of devices could be used to force the material into the tunnel such as packing fingers, screw augers, packing plates, etc.

The numeral 24 refers to an I-beam which is secured to the wheeled frame and which extends across the width of the tunnel. Although it is preferred that the beam 24 extend completely between the sides of the tunnel, the I-beam 24 could have its ends terminating inwardly of the sides of the tunnel, if so desired. For purposes of description, I-beam 24 will be described as including a rear flange 26, front flange 28 and web 30 which extends therebetween. Also for purposes of description, I-beam 24 will be described as including a left end 32 and a right end 34 as viewed from the rear of the machine.

Figure 2:
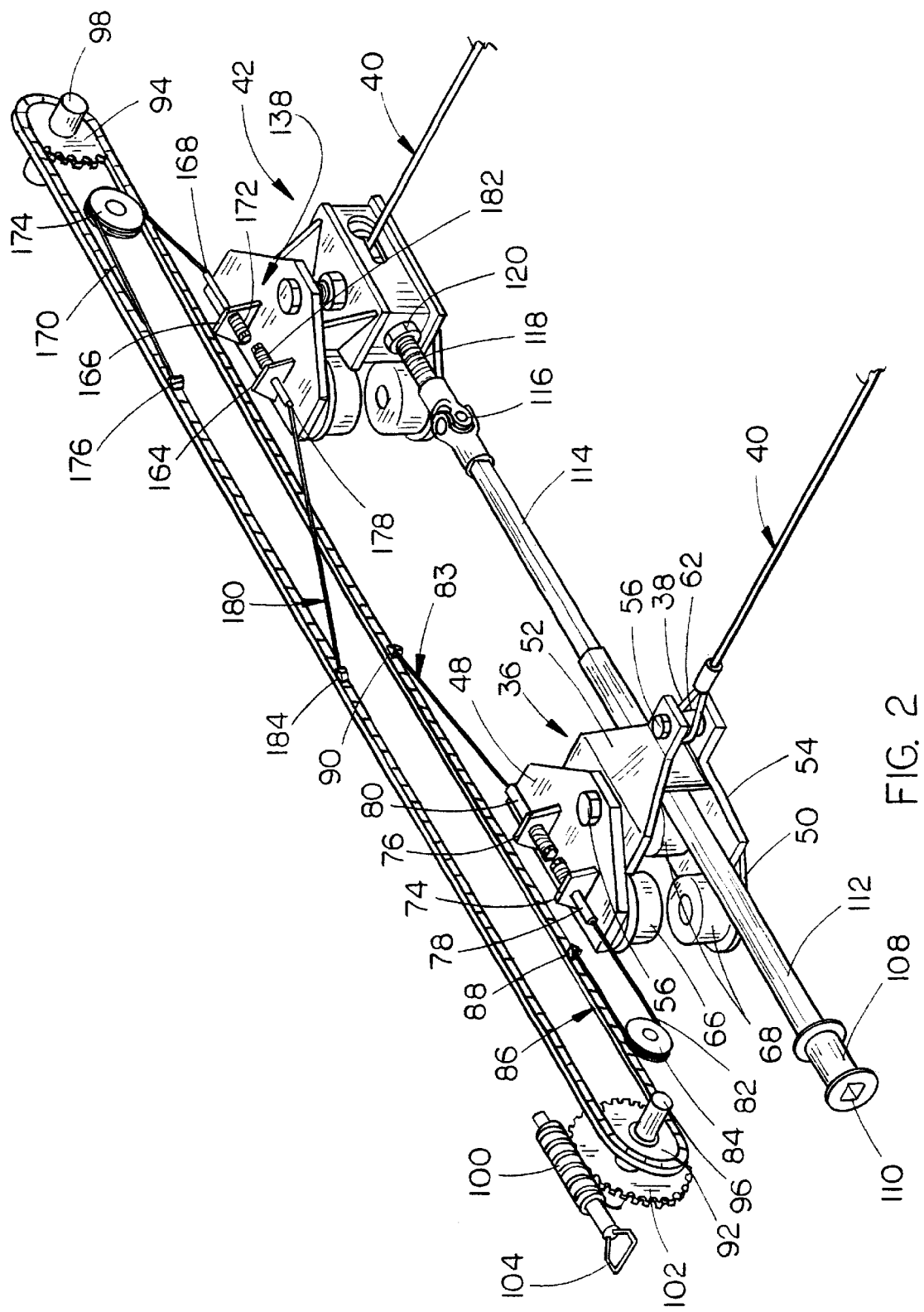
FIG. 2 is a perspective view of one means for adjusting the width of the U-shaped cable.
Figure 6A:
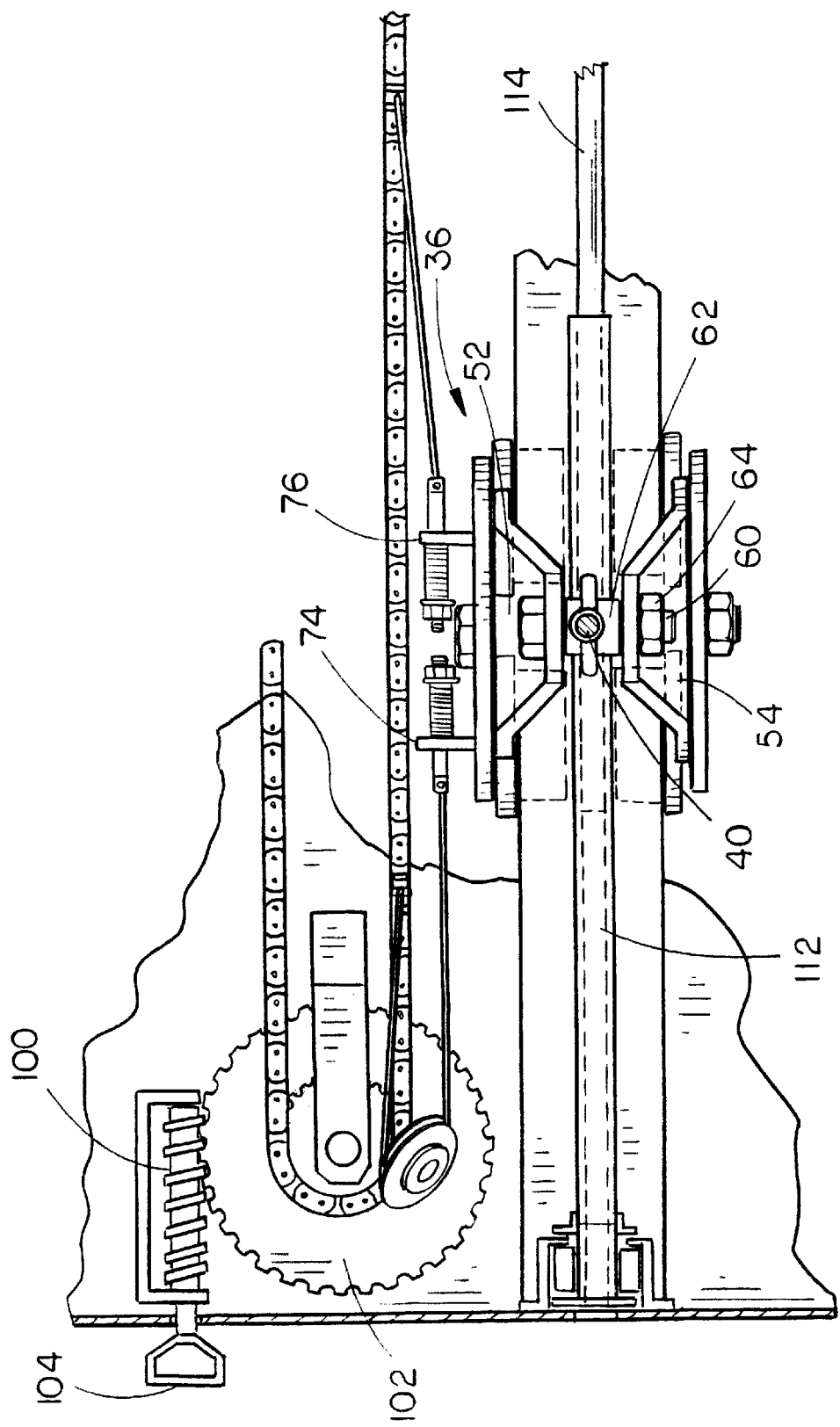
FIG. 6A is a partial rear elevational view of the apparatus for securing and moving a trolley which has one end of the cable loop fixed thereto.
Figure 6B:
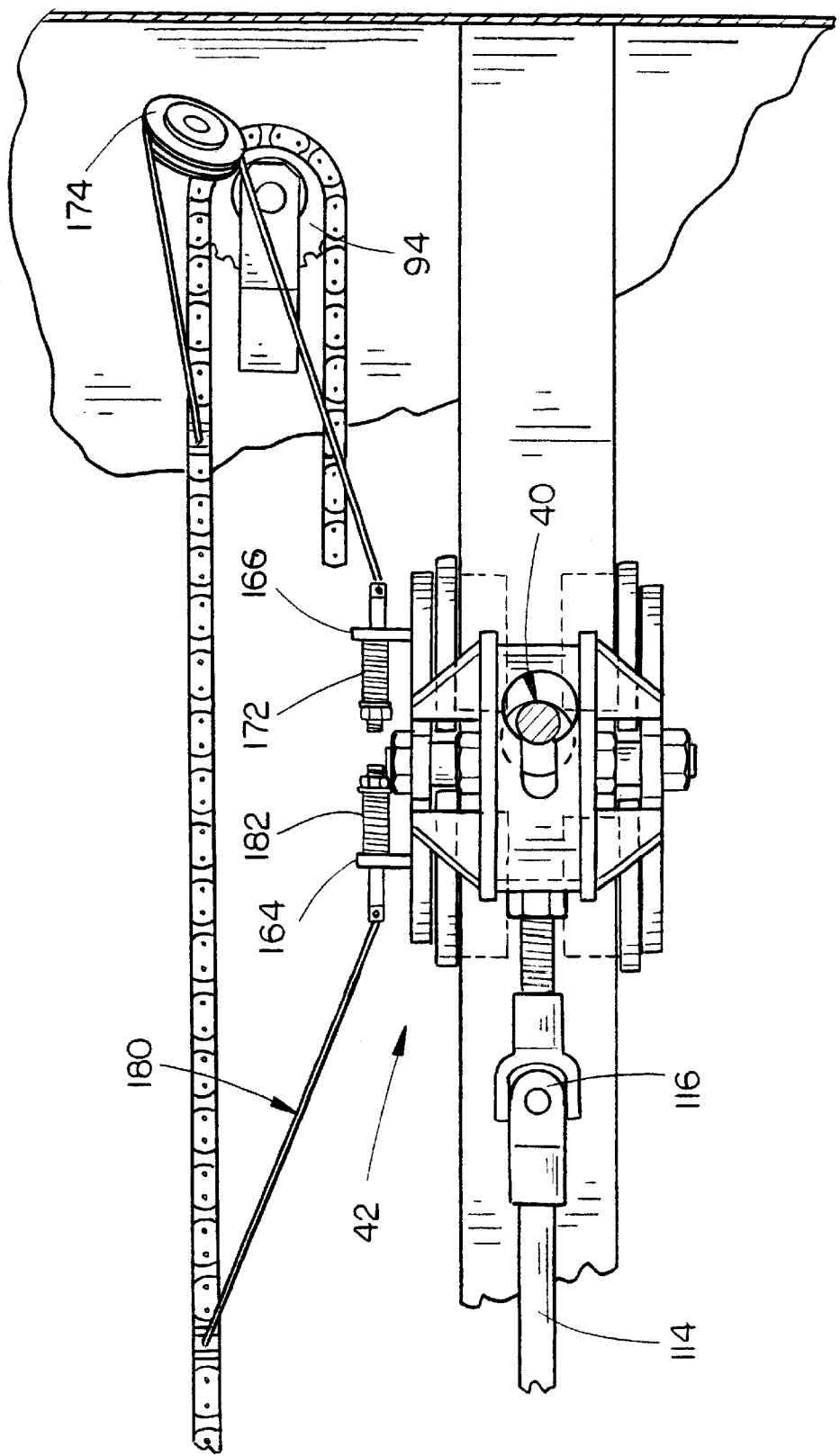
FIG. 6B is a partial rear elevational view of the structure of FIG. 3.
Figure 9:
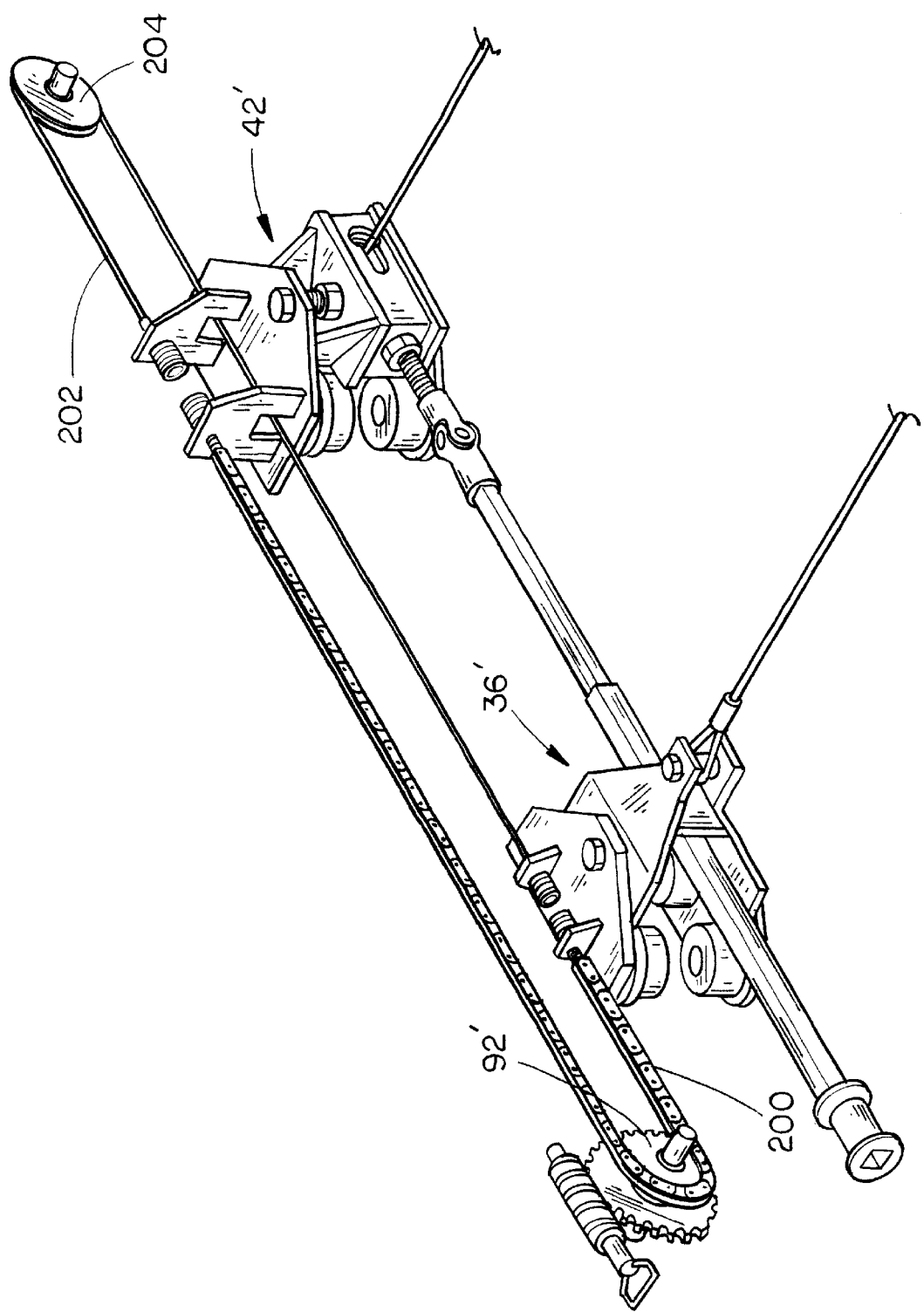
FIG. 9 is a perspective view of the preferred means for adjusting the width of the U-shaped cable.

The numeral 36 refers to a trolley which is selectively movably mounted on the beam 24 between the middle of the beam 24 and the left end 32 thereof. The end 38 of a U-shaped cable 40 is fixed to the trolley 36 as will be described in more detail hereinafter. The numeral 42 refers to a trolley which is movably mounted on the I-beam 24 between the middle thereof and the right end 34 thereof. The end 44 of cable 40 has a knob, ball or enlarged portion 46 mounted thereon to enable the end 44 of the cable 40 to be selectively releasably secured to the trolley 42, as will be described in more detail hereinafter. FIGS. 2, 6A and 6B illustrate one means of moving the trolleys 36 and 42 in tandem while FIG. 9 illustrates the preferred means for moving the trolleys in tandem.

Figure 7:
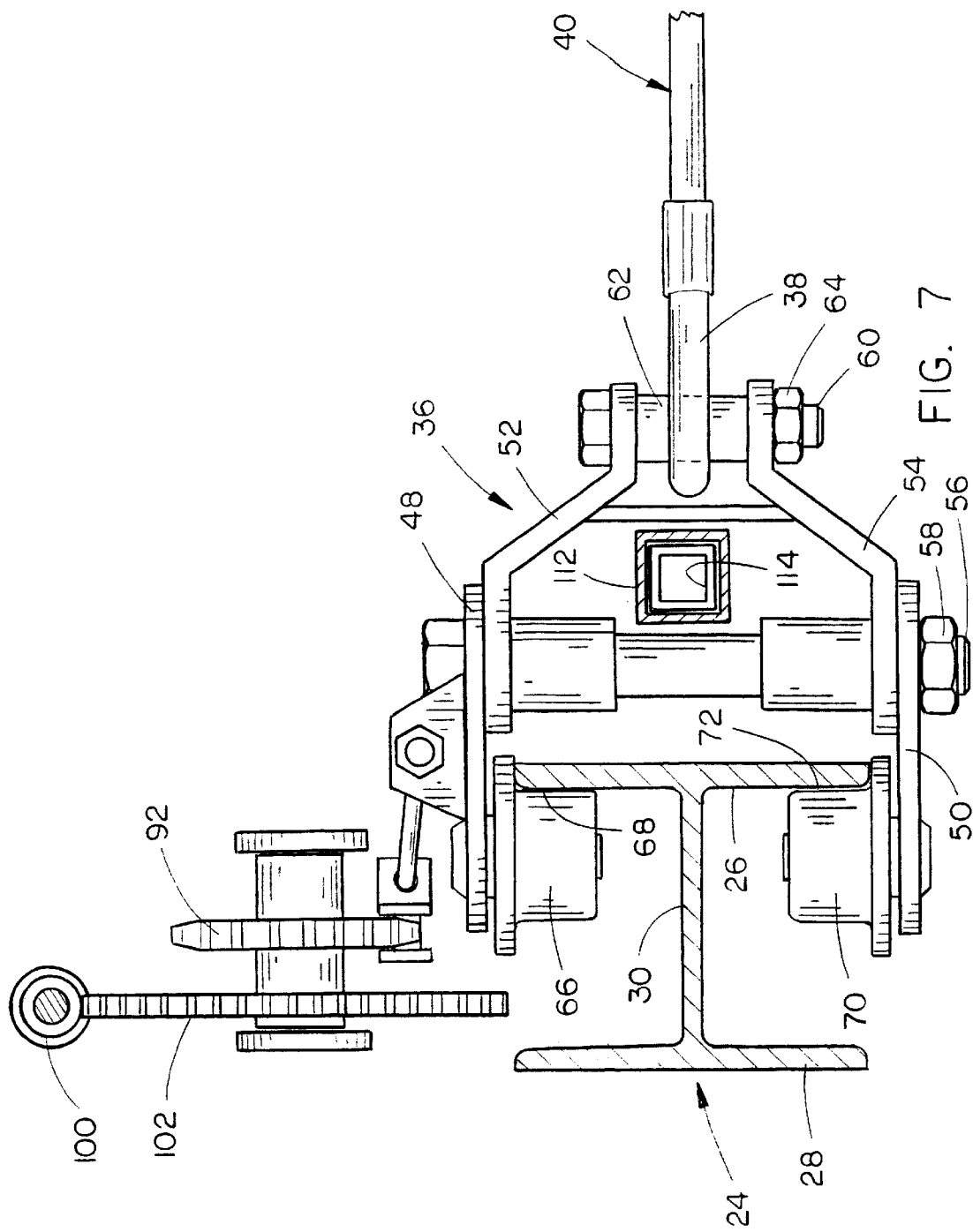
FIG. 7 is a top view of the structure of FIG. 6A.

Referring to FIG. 7, trolley 36 includes upper plate 48, lower plate 50, and spaced-apart angular plates 52 and 54. Bolt 56 extends through plates 48, 52, 54 and 50 and is maintained therein by nut 58. The rearward ends of plates 52 and 54 have a bolt 60 extending therebetween which has a collar or sleeve 62 mounted thereon, as seen in FIG. 7. Nut 64 is mounted on bolt 60 in conventional fashion. The end 38 of cable 40 which is in the form of an "eye loop" is secured to the collar 62, as seen in FIGS. 2 and 7. A pair of horizontally spaced-apart rollers 66 are rotatably secured to the forward end of plate 48 which have a bearing surface 68 which engages the forward side of the upper end of flange 26 of beam 24. A pair of horizontally spaced-apart rollers 70 are rotatably secured to the forward ends of plate 50 and have bearing surfaces 72 which engage the forward side of the lower end of flange 26 of beam 24. A pair of upstanding brackets or plates 74 and 76 are welded to the upper surface of plate 48 and have the ends 78 and 80 of cables 82 and 83 secured thereto, respectively, in a spring-like manner. As seen in FIG. 2, cable 82 extends over a pulley 84 and is connected to a chain 86 at 88. Cable 83 is secured to chain 86 at 90.

Chain 86 extends around and between sprockets 92 and 94 which are mounted upon shafts 96 and 98, respectively, which are rotatably mounted on the frame of the bagging machine 10. Worm gear 100 is in engagement with the teeth of Sprocket 102 which is also mounted on the shaft 96 and which has a D-shaped member 104 secured to one end thereof. Rotation of the worm gear 100 causes sprocket 102 to be rotated which causes shaft 96 to be rotated which in turn causes chain 86 to be moved in either a clockwise direction or a counterclockwise direction, as viewed in FIG. 2, depending upon the rotation of worm gear 100. As seen in FIG. 1, the D-shaped member 104 is positioned outwardly of the side of the tunnel 14 so that any suitable actuator may be connected thereto to either directly or activated remotely, rotate the worm gear 100 in either of its two directions of rotation.

Figure 3:
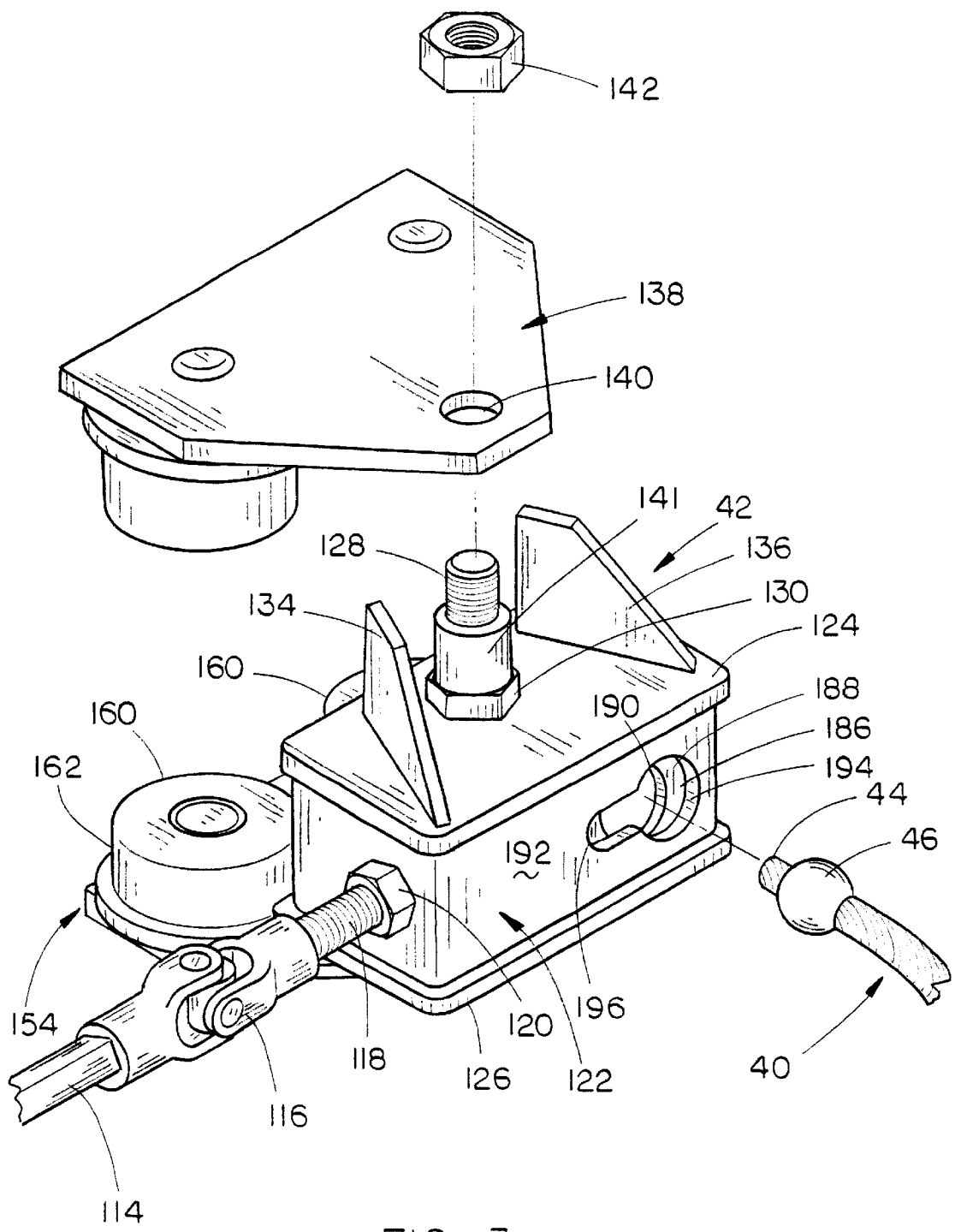
FIG. 3 is a partial perspective view of the means for releasably connecting one end of the cable loop thereto.
Figure 4:
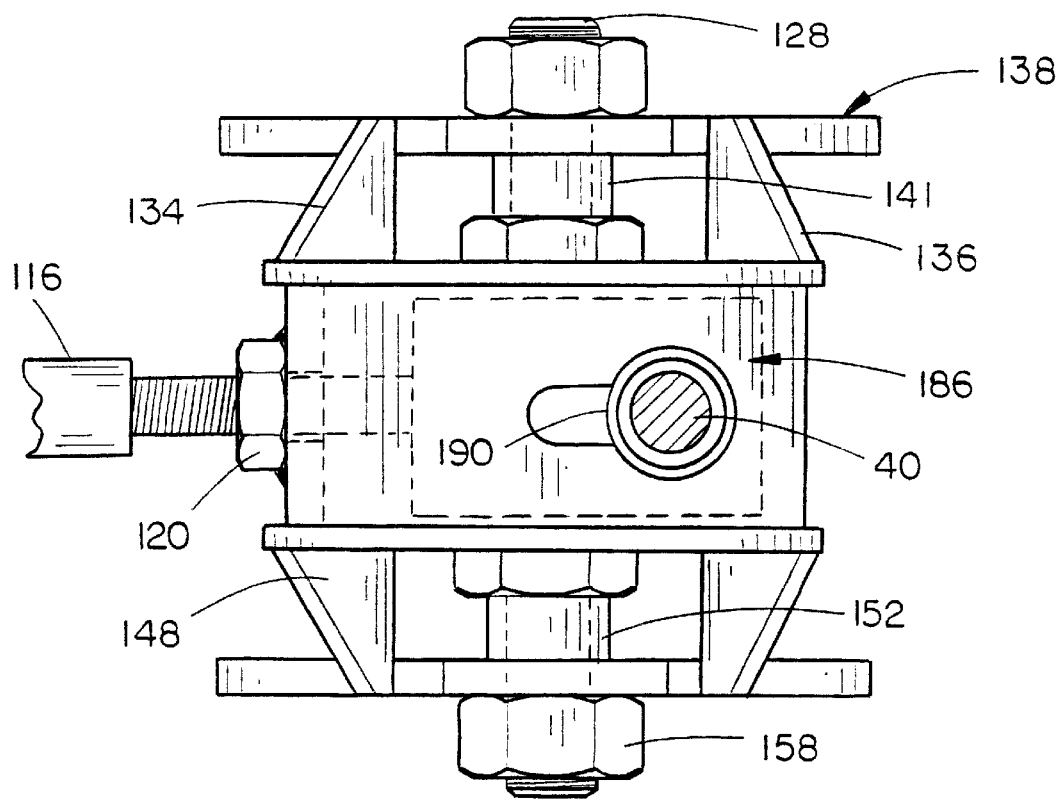
FIG. 4 is a rear elevational view of the apparatus of FIG. 3.

Regarding the second trolley 42, with a releasing mechanism: Tunnel 14 is also provided with an opening 106 formed therein in which is mounted a collar-like bushing 108 having a quadrilateral opening 110 formed in its outer end. Tube 112 is secured to the inner end of bushing 108 and extends inwardly into the tunnel between the upper and lower plates of the trolley 36, as seen in FIGS. 1, 2 and 7. Tube 114 is telescopically received in the inner end of tube 112 and has a universal joint 116 secured to its inner end, as seen in FIG. 3. A threaded stud 118 has one end fixed to the inner end of universal joint 116 for rotation therewith and threadably extends through a nut 120 which is welded to the inner end of a hollow box-like member 122 (FIG. 3) which forms a part of trolley 42. An upper plate 124 is welded to the upper end of the member 122 and a bottom plate 126 is welded to the lower end of member 122. Stud 128 (FIG. 3) extends through member 122 and has lock nuts 130 and 132 threadably secured thereto to maintain stud 128 in position with respect to member 122. A pair of plates 134 and 136 are welded to top plate 124 and extend upwardly therefrom for engagement with plate 138 thereon. Plate 138 has an opening 140 formed therein which receives the upper end of the stud 128. Nut 142 is threadably mounted on the upper end of stud 128 to maintain the plate 138 on the stud 128 and in engagement with plates 134 and 136. The rearward end of plate 138 rests upon collar 141 which is positioned on stud 128, as seen in FIG. 4. A pair of horizontally spaced-apart rollers 146 (FIG. 8) are rotatably secured to the forward end of plate 138 and have bearing surfaces 146 which engage the forward surface of the upper end of flange 26 of I-beam 24.

A pair of plates 148 and 150 (FIG. 5) are welded to the underside of plate 126 and extend downwardly therefrom, as seen in the drawings. Collar 152 is mounted on the lower end of stud 128 with the plate 152 being in engagement with the lower end thereof. Plate 154 (FIG. 5) is shaped like plate 138 and has an inner end 156 which is received between the lower ends of the plates 148 and 150. Nut 158 is threadably mounted on the lower end of stud 128 to maintain plate 154 in position.

Figure 8:
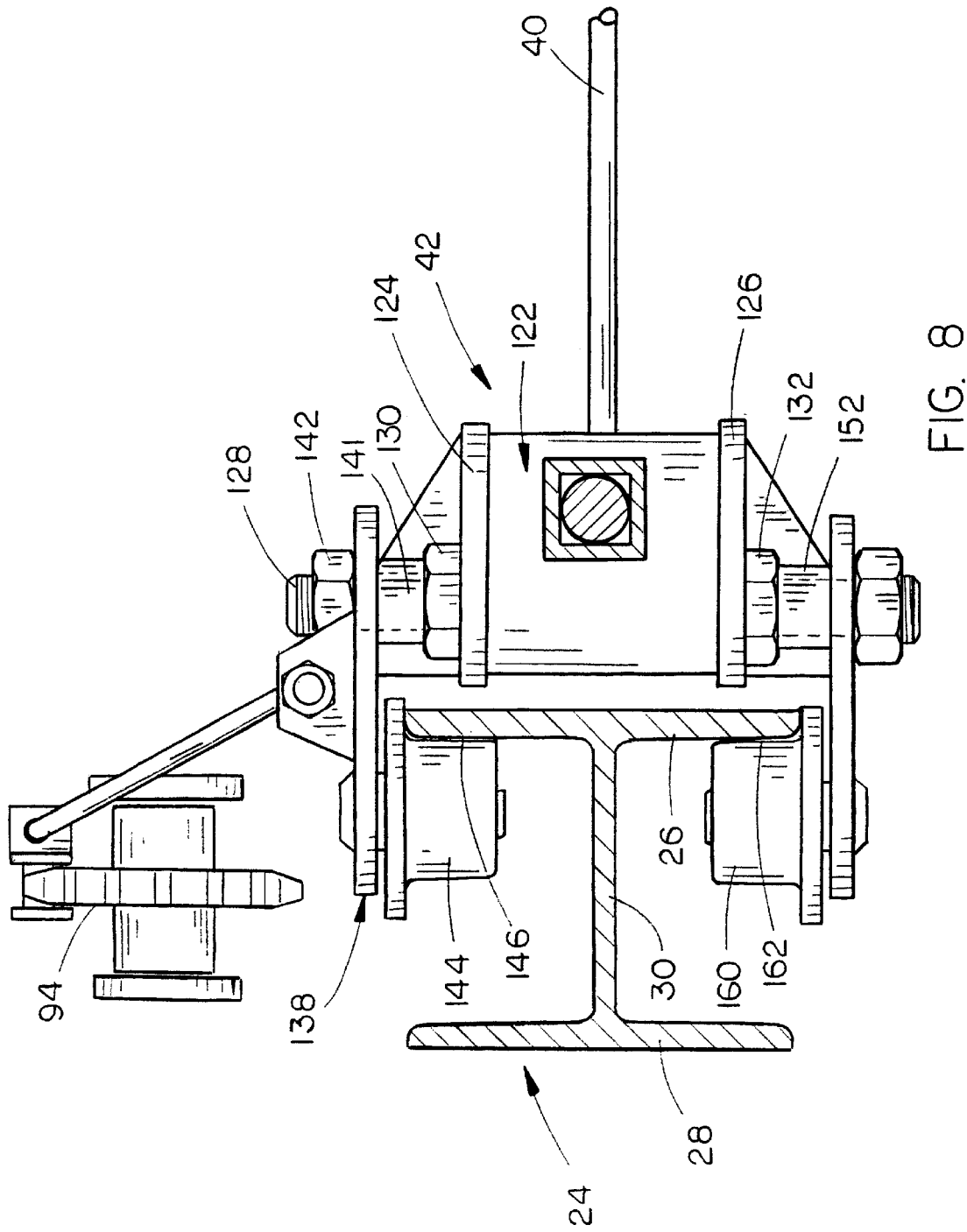
FIG. 8 is a partial sectional view illustrating the release trolley.

A pair of horizontally spaced-apart rollers 160 (FIG. 3) are rotatably mounted on the upper side of plate 154 and have bearing surfaces 162 which engage the forward side of the lower end of flange 26 of I-beam 24, as seen in FIG. 8.

A pair of brackets or plates 164 and 166 (FIG. 6B) are welded to the upper surface of plate 138, as seen in FIG. 2. End 168 of cable 170 is secured to the bracket 166 by means of a spring 172. Cable 170 (FIG. 2) extends around pulley 174 and is secured to chain 86 at 176. End 178 of cable 180 is secured to plate 164 by means of a spring 182. The other end of cable 180 is secured to chain 86 at 184 (FIG. 2).

Figure 5:
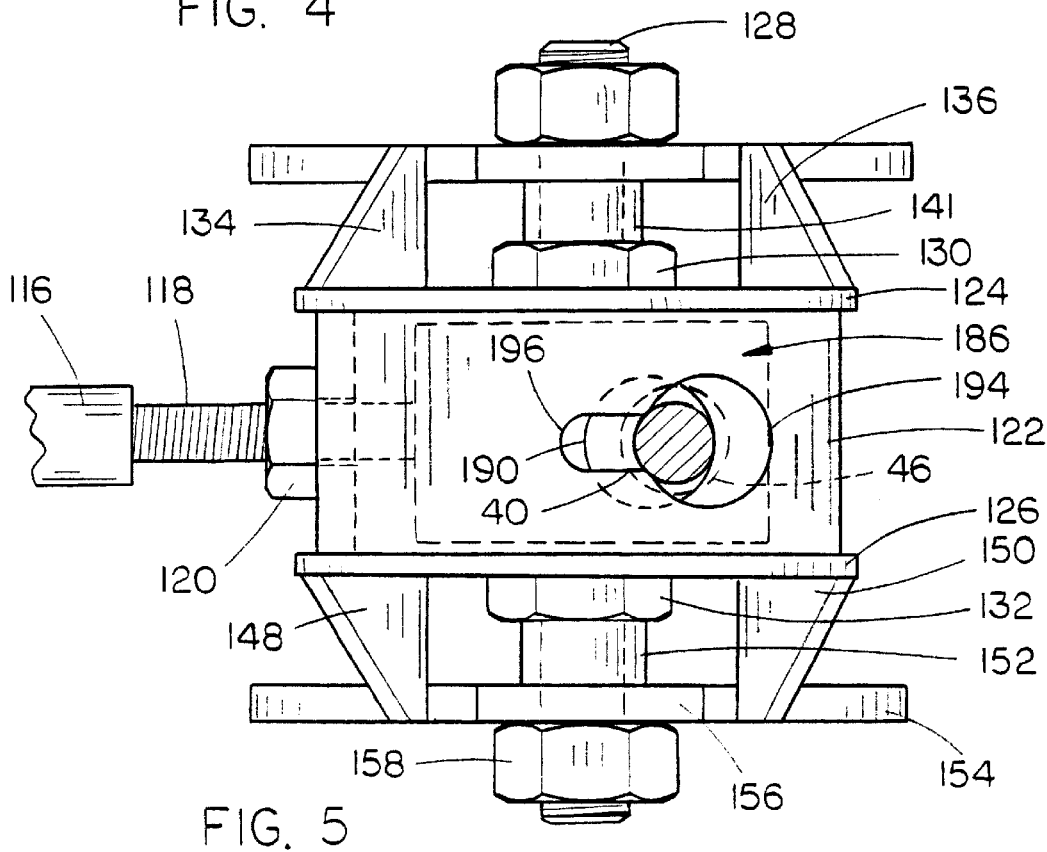
FIG. 5 is a view similar to FIG. 4 except that the cup within the apparatus has been moved to trap one end of the cable loop therein.

The inner end of stud 118 (FIG. 3) is rotatably connected to a hollow box-like member 186 which is movably mounted within member 122 either to the right or to the left, as viewed in FIG. 1, depending upon the direction of rotation of the stud 118 by the universal joint 116, tubes 114 and 112. The rearward side or wall 188 (FIG. 3) of box 186 has a circular opening 190 formed therein. The rear wall 192 of member 122 has a semi-circular opening 194 formed therein which communicates with a slot 196 extending therefrom. When the box 186 is in the position of FIG. 4, the circular opening 190 in the box 186 registers or is aligned with the semi-circular opening 194 which permits the knob or ball 46 on the cable 40 (FIG. 3) to be inserted into the interior of the box 186 inwardly of the opening 190. Movement of the box 186 from the position of FIG. 4 to the position of FIG. 5 causes the opening 190 to move to the left with respect to the opening 194 which "traps" the knob or ball 46 within the box 186, as seen in FIG. 5. Thus, when the box 186 is in the position of FIG. 5, the ball 46 of the cable 40 is securely secured to the trolley 36. Conversely, when the box 186 is in the position of FIG. 4, the ball 46 may be either inserted into the interior of the box 186 or pulled rearward therefrom. It is anticipated that an air or hydraulic activated device will be used to release the end of the cable.

According to the description hereinabove, it can be seen that the distance between the forward ends of the cable 40 may be easily and finitely adjusted. Rotation of the worm gear 100 in one direction causes the trolleys 36 and 42 to be moved away from one another while rotation of the worm gear in an opposite direction causes the trolleys 36 and 42 to be moved towards one another.

Initially, prior to the bagging operation, the ball 46 will be secured to the trolley 42 through movement of the box 186, as previously described, to firmly attach one end of the cable 40 to the trolley 42. The other end of the cable 40 will also have been secured to the trolley 36. During the bagging operation, the adjustment of the positions of the trolleys 36 and 42 with respect to one another permits the operator to achieve the desired density of the material being bagged. Generally speaking, less density in the material will be achieved when the trolleys are closer together than when they are farther apart. The cable 40 also acts as an anchor in the material to hold the machine back against the compaction of the bag without cables, back-stops or brakes. Although a U-shaped cable has been described, individual chains or cables could be separately attached to the trolleys 36 and 42 with those individual chains or cables having adjustable anchors or fixed anchors at their rearward ends.

When the bagging operation has been completed and it is desired to pull the cable 40 from the bagged material, the operator inserts a suitable tool into the opening 110 (FIG. 2) of the bushing 108 to rotate the tubes 112 and 114 which causes the rotation of the stud 118 to move the box 186 from the position of FIG. 5 to the position of FIG. 4. Forward movement of the machine with respect to the bag will cause the ball 46 to be moved rearwardly through the openings 190 and 194 so that the density control/anchor cable may be released from the trolley and easily removed from the bagged material.

As stated, FIG. 9 illustrates the preferred means for moving the trolleys in tandem, either towards one another or away from one another. In FIG. 9, the numerals 36' and 42' refer to the trolleys which are essentially identical to trolleys 36 and 42, respectively. One end of chain 200 is secured to trolley 36' and extends around sprocket 92'. The other end of chain 200 is connected to trolley 42'. One end of cable 202 is secured to trolley 42' and extends around a pulley 204. The other end of cable 202 is connected to trolley 36', as seen in FIG. 9. Sprocket 92' is driven in the same manner as sprocket 92, as previously described. Rotation of sprocket 92' in a clockwise direction causes trolleys 36' and 42' to move away from one another in tandem. Rotation of sprocket 92' in a counterclockwise direction causes trolleys 36' and 42' to move towards one another in tandem.

Thus it can be seen that the invention accomplishes at least all of its stated objectives.

I claim:

1. A bagging machine for bagging material into a bag having a closed end and an open mouth, comprising:
   a movable frame having rearward and forward ends;
   a tunnel on said frame having an intake end for receiving the material to be bagged and an output end adapted to receive the open mouth of the bag;
   means on said frame for receiving the material to be bagged;
   means on said frame for forcing the material to be bagged through said tunnel and into said bag;
   a transversely extending beam on said frame having first and second ends;
   a first trolley movably mounted on said beam;
   a second trolley movably mounted on said beam in an spaced relationship to said first trolley;
   a first anchor cable secured to said first trolley and extending rearwardly therefrom into the material being bagged;
   a second anchor cable secured to said second trolley and extending rearwardly therefrom into the material being bagged;
   an actuator operatively connected to said first and second trolleys whereby said first and second trolleys may be selectively moved in tandem towards one another or moved in tandem away from one another.

2. The machine of claim 1 wherein said first and second anchor cables are joined by an arcuate portion to define a U-shaped cable.

3. The machine of claim 2 wherein said cable is fixed to said first trolley and may be quickly released from said second trolley from a position remote from said second trolley.

4. A bagging machine for bagging material into a bag having a closed end and an open mouth, comprising:
   a movable frame having rearward and forward ends;
   a tunnel on said frame having an intake end for receiving the material to be bagged and an output end adapted to receive the open mouth of the bag;
   means on said frame for receiving the material to be bagged;
   means on said frame for forcing the material to be bagged through said tunnel and into said bag;
   a transversely extending beam on said frame having first and second ends;
   a first trolley movably mounted on said beam;
   a second trolley movably mounted on said beam in an spaced relationship to said first trolley;
   a U-shaped cable having first and second ends;
   said first end of said U-shaped cable being secured to said first trolley;
   said second end of said U-shaped cable being secured to said second trolley;
   a sprocket rotatably mounted on said frame;
   means for rotating said sprocket;
   a pulley rotatably mounted on said frame in a horizontally spaced-apart relationship with respect to said first sprocket;
   a chain, having first and second ends, extending around said sprocket;
   a cable, having first and second ends, extending around said pulley;
   said first end of said chain being connected to said first trolley
   said second end of said chain being connected to said second trolley;
   said first end of said cable being connected to said first trolley;
   said second end of said cable being connected to said second trolley;
   whereby movement of said chain in one direction will cause said first and second trolleys to move in tandem towards one another and whereby movement of said chain in a direction opposite to said one direction will cause said first and second trolleys to move in tandem away from one another.

5. The machine of claim 4 wherein said means for rotating said sprocket is controllable from a position outwardly of said tunnel.

6. The machine of claim 4 wherein said sprocket and said pulley are mounted on first and second shafts, respectively, and wherein a second larger sprocket is mounted on said first shaft for rotation therewith and wherein a worm gear is in operative engagement with said second larger sprocket for selectively rotating said sprockets.

7. The machine of claim 6 wherein said worm gear is accessible from a position outwardly of said tunnel.

8. The machine of claim 4 wherein said one end of said U-shaped cable is fixed to said first trolley and wherein said second end of said U-shaped cable is selectively releasably secured to said second trolley.

9. The machine of claim 8 wherein said second end of said U-shaped cable may be selectively released from said second trolley from a position outwardly of said tunnel.

10. The machine of claim 9 wherein said second end of said U-shaped cable has a ball mounted thereon which is insertable into said second trolley and which may be selectively trapped therein or released therefrom.

11. The machine of claim 4 wherein said beam comprises an I-beam having a vertically disposed rear flange, a vertically disposed front flange, and a web extending therebetween.

12. The machine of claim 11 wherein said first and second trolleys are movably mounted on said rear flange of said I-beam.

13. The machine of claim 12 wherein each of said first and second trolleys have rollers thereon which engage said rear flange.

14. The machine of claim 13 wherein said second trolley has a trap means thereon for trapping said second end of said U-shaped cable thereon and wherein a telescopic tube extends from said trap means laterally therefrom towards one side of said tunnel.

15. The machine of claim 14 wherein said trap means comprises a selectively movable box positioned within said second trolley and which has a rear wall including a circular opening formed therein; said second trolley having a rear wall including a semicircular opening having a slot extending therefrom; said second end of said U-shaped cable having an enlarged portion thereon which may pass through said semi-circular opening and said circular opening when said box is in a first position; said box preventing said enlarged portion of said U-shaped cable from passing rearwardly through said semi-circular opening when said box is in a second position.

16. The machine of claim 15 including a telescopic member extending from said box to a position outwardly of said tunnel for moving said box between its said first and second positions.

17. A bagging machine for bagging material into a bag having a closed end and an open mouth, comprising:

a movable frame having rearward and forward ends;

a tunnel on said frame having an intake end for receiving the material to be bagged and an output end adapted to receive the open mouth of the bag;

means on said frame for receiving the material to be bagged;

means on said frame for forcing the material to be bagged through said tunnel and into said bag;

a transversely extending beam on said frame having first and second ends;

a first trolley movably mounted on said beam;

a second trolley movably mounted on said beam in an spaced relationship to said first trolley;

a U-shaped cable having first and second ends;

said first end of said U-shaped cable being secured to said first trolley;

said second end of said U-shaped cable being secured to said second trolley;

a first sprocket rotatably mounted on said frame;

a second sprocket rotatably mounted on said frame in a horizontally spaced-apart relationship with respect to said first sprocket;

an endless chain extending around said first and second sprockets;

means for rotating one of said sprockets;

said first and second trolleys being operatively connected to said endless chain whereby movement of said endless chain in one direction will cause said first and second trolleys to move in tandem towards one another and whereby movement of said endless chain in a direction opposite to said one position will cause said first and second trolleys to move in tandem away from one another.

18. The machine of claim 17 wherein said means for rotating one of said sprockets is controllable from a position outwardly of said tunnel.

19. The machine of claim 17 wherein said first and second sprockets are mounted on first and second shafts, respectively, and wherein a third sprocket is mounted on said first shaft for rotation therewith and wherein a worm gear is in operative engagement with said third sprocket for selectively rotating said third and first sprockets.

20. The machine of claim 19 wherein said worm gear is accessible from a position outwardly of said tunnel.

* * * * *